(12) United States Patent
Thom

(10) Patent No.: US 6,350,511 B2
(45) Date of Patent: Feb. 26, 2002

(54) MELAMINE RESIN FOAM

(75) Inventor: Arnd Thom, Alzey (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/826,167

(22) Filed: Apr. 5, 2001

(30) Foreign Application Priority Data

Apr. 15, 2000 (DE) .......................................... 100 18 768

(51) Int. Cl.⁷ .................................................. C08J 9/40
(52) U.S. Cl. ............................... 428/308.4; 428/319.3; 521/57; 521/85; 521/94; 521/187
(58) Field of Search .............................. 521/57, 85, 94, 521/187; 428/308.4, 319.3

(56) References Cited

U.S. PATENT DOCUMENTS 5,413,853 A * 5/1995 Hasagawa et al. .......... 521/187

FOREIGN PATENT DOCUMENTS

EP      071 672      2/1983

* cited by examiner

Primary Examiner—Morton Foelak
(74) Attorney, Agent, or Firm—Oblon, Spivak, McClelland, Maier & Neustadt, P.C.

(57) ABSTRACT

The invention relates to open-celled melamine foams which have improved fire performance and whose cell-structure surface has been to some extent or entirely coated with an ammonium salt.

7 Claims, No Drawings

MELAMINE RESIN FOAM

The invention relates to an open-celled melamine resin foam (MF foam) with improved fire performance.

MF foams have low density, good mechanical workability and especially outstanding sound absorption. A commercially available product of this type is BASOTECT® from BASF Aktiengesellschaft, which is increasingly used in the construction sector, but also for internal vehicle parts.

The chemical composition of MF foams gives them advantageous fire performance. For example, they achieve fire class B1 to DIN 4102. Recently, stricter requirements have been placed on the fire performance of foams in the construction sector, in particular in Scandinavian countries, and the known MF foams do not, for example, achieve fire class A to Nordtest NT Fire 004.

It is an object of the present invention, therefore, to provide a further improvement in the fire performance of MF foams.

We have found that this object is achieved by using MF foams whose cell-structure surface has been to some extent or entirely coated with an ammonium salt, preferably using from 0.1 to 20% by weight, in particular from 1 to 10% by weight. To give an adequate extent of fire resistance, the depth of penetration of the ammonium salt into the foam should be at least 1 mm, preferably 2 to 20 mm.

Preferred flame retardants are the salts of phosphoric acid, in particular ammonium orthophosphate and ammonium polyphosphate. The ammonium salt is used as an aqueous solution, preferably of from 1 to 50% strength by weight, in particular of from 5 to 30% strength by weight.

MF foams are known per se, for example from EP-B 71 672. According to EP-B 17 671, they are produced by foaming an aqueous solution of an MF condensation procuct which comprises an emulsifier, an acidic curing agent, and a blowing agent, preferably a $C_5$–$C_7$ hydrocarbon, and curing the MF condensate at an elevated temperature. According to the invention, an aqueous solution of the ammonium salt is now used to coat, spray or saturate these foams, excess liquid is squeezed out if appropriate, and the foam is dried.

This can be done at an elevated temperature by using hot air or circulating air, or in drying ovens, or by treating with microwaves or with infrared radiation, but preferably simply by storage at room temperature in free contact with the atmosphere for a number of hours.

In the case of relatively large moldings it is useful to treat the entire surface with the ammonium salt solution, and the depth of penetration of the solution here should be at least 1 mm. Relatively small moldings can be completely immersed into the solution. In the case of sheets, it is frequently sufficient for these to be coated or sprayed on just one side with the ammonium salt solution. The amounts to be applied are then preferably within the range from 20 to 200 g of a 20% strength solution per $m^2$ of surface.

The good properties of the MF foam, such as mechanical workability and sound absorption, are not impaired by coating according to the invention with the ammonium salt, but fire performance is considerably improved.

In addition to the application in the construction sector and in the automotive industry, the MF foams according to the invention can be used in shipbuilding for the thermal and sound insulation of engine-rooms, where they comply with the marine standard IMO A. 635.

EXAMPLE

One side of a sheet of MF foam of dimensions 23×23×1 cm and of density 0.01 $g/cm^3$ (BASOTECT 2011) was sprayed with a 20% strength by weight solution of ammonium orthophosphate. The amount applied was about 50 g of solution per $m^2$. The sheet was dried overnight in free contact with the atmosphere. It then comprised about 0.5 g, i.e. 10% by weight, of ammonium salt. It achieved fire class A in the NT Fire 004 fire test.

I claim:

1. An open-celled melamine-resin foam (MF foam), whose cell-structure surface has been to some extent or entirely coated with an ammonium salt.

2. An MF foam as claimed in claim 1, wherein the ammonium salt content is from 0.1 to 20% by weight.

3. An MF foam as claimed in claim 1, wherein the depth of penetration of the ammonium salt into the surface of the foam is at least 1 mm.

4. An MF foam as claimed in claim 1, wherein the ammonium salt is a salt of phosphoric acid, in particular ammonium phosphate or ammonium polyphosphate.

5. A process for producing the MF foam as claimed in claim 1, which comprises using an aqueous solution of the ammonium salt to coat, spray or saturate the foam, squeezing out excess liquid if appropriate, and drying the foam.

6. A process as claimed in claim 5, wherein the strength of the solution is from 1 to 50% by weight.

7. An open-celled MF foam which achieves fire class A in the NT Fire 004 fire test.

* * * * *